United States Patent Office 3,642,731
Patented Feb. 15, 1972

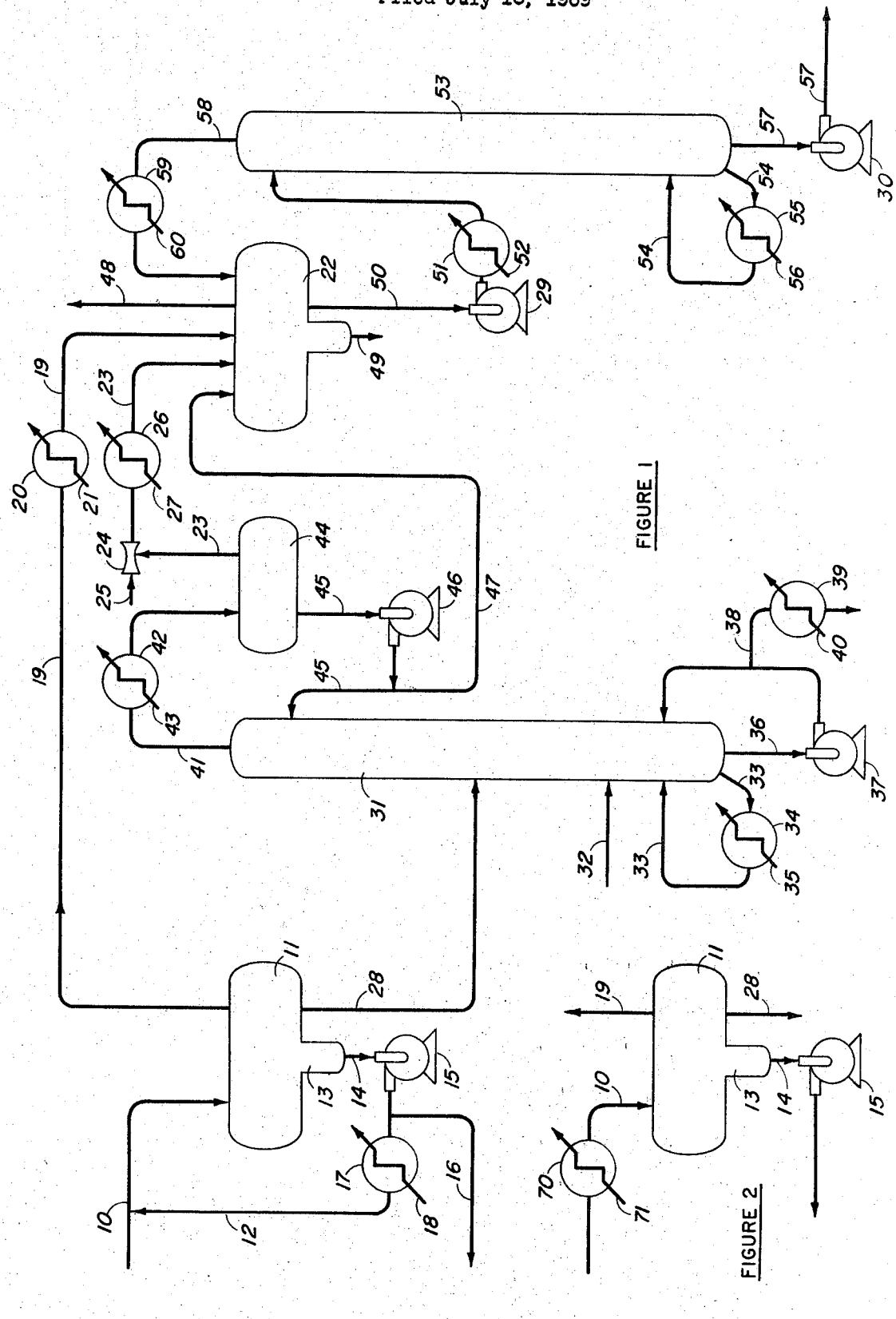

3,642,731
NOVEL PROCESS FOR SOLVENT PURIFICATION AND RECOVERY
Bruce R. Tegge and William L. Teiser, Madison, James H. Love, Parsippany, and Barry M. Rosenbaum, Morris Plains, N.J., assignors to Esso Research and Engineering Company
Filed July 18, 1969, Ser. No. 842,907
Int. Cl. C08f *15/04*
U.S. Cl. 260—80.78
8 Claims

ABSTRACT OF THE DISCLOSURE

In the production of polymers of ethylene, higher alpha olefins and optionally a third monomer, the reactants may leave the polymerization reaction as a cement which may be steam-flashed to yield a flash overhead gas containing inter alia diluent-solvent and heavy impurities. Recovery and recycling of a major portion of pure diluent-solvent, substantially free of heavy impurities, is effected by partial condensation of the flash overhead gas to form (i) a partial condensate containing a substantial portion of the heavy impurities and a minor portion of diluent-solvent and (ii) a non-condensed gas containing a major portion of diluent solvent (substantially free of heavy impurities) which major portion may be recycled.

BACKGROUND OF THE INVENTION

This invention relates to a process for preparing novel polymer compositions. More specifically, it relates to improvements in the production of copolymers of ethylene and higher alpha olefins.

As is well known to those skilled in the art, copolymers of ethylene and higher alpha olefins, such as propylene, with other polymerizable third monomers have been prepared. Typical of these other or third monomers may be nonconjugated dienes such as 5-methylidene-2-norbornene (MNB), 5 - ethylidene - 2 - norbornene (ENB), dicyclopentadiene, or 1,4-hexadiene.

Typically the polymerization reaction to form the copolymer may be carried out in the presence of a catalyst composition including a compound of a transition metal halide, typically vanadyl chloride $VOCl_3$ and, as a cocatalyst, an organometal compound, typically diethyl aluminum chloride. The reaction may be carried out in the presence of a non-reactive reaction medium or diluent solvent which may be a saturated aliphatic hydrocarbon such as propane, pentane, hexane, or heptane, preferably hexane; an aromatic hydrocarbon such as toluene; or a chloro-hydrocarbon such as tetrachloroethylene. The reaction may be under substantially anhydrous and anaerobic conditions. Water and oxygen must be excluded from the system to obtain maximum copolymer yield; and the reactants may be treated to insure that they are oxygen-free and dry.

Upon termination of the reaction, the reaction mixture may contain the desired product copolymer (typically the terpolymer of ethylene, higher alpha olefin, and third monomer) together with light components containing unreacted ethylene and unreacted propylene, and heavy components containing unreacted third monomer, diluent-solvent, by-product oligomers, and catalyst residues including mainly spent catalyst. A substantial portion of the operating and capital expense for a polymer plant is directed to the separation of the polymer from the reactor effluent and to the recovery therefrom of the unreacted monomers and diluent-solvent.

It is an object of this invention to provide a process for effecting efficient recovery of solvent-diluent and unreacted monomers. Other objects will be apparent to those skilled in the art from the inspection of the following description.

SUMMARY OF THE INVENTION

In accordance with certain of its aspects, the novel improvement of this invention in the process for preparing a copolymer of ethylene and a $C_3$ to $C_{10}$ higher alpha olefin including forming a mixture of ethylene and a $C_3$ to $C_{10}$ higher alpha olefin;

Contacting said mixture in a reaction medium including a liquid diluent-solvent with a catalytic amount of a catalyst composition containing, as catalyst, a compound of a transition metal and, as cocatalyst, an organometal compound, thereby forming a copolymer of ethylene and a $C_3$ to $C_{10}$ higher alpha olefin;

Withdrawing from said reaction medium a liquid reactor effluent containing catalyst composition, unreacted ethylene and higher alpha olefin, and a cement of copolymer in said liquid diluent-solvent; and Steam-flashing said liquid reactor effluent thereby separating as bottoms an aqueous polymer slurry substantially free of diluent-solvent and a flash overhead gas containing diluent-solvent and heavy impurities; may comprise Partially condensing said flash overhead gas thereby forming (a) a non-condensed gas containing a major portion of diluent-solvent substantially free of heavy impurities, and (b) a partial condensate containing a substantial portion of the heavy impurities and a minor portion of diluent-solvent; and Recovering said major portion of diluent-solvent substantially free of heavy impurities.

DESCRIPTION OF THE INVENTION

The ethylene used in practice of this invention as first monomer may typically be purified commercially available ethylene of greater than 99.0% purity, typically 99.0%–99.5%, say 99.5%.

The higher alpha olefin, also called a terminal olefin, which may be used in the practice of this invention as a second monomer, may be a purified commercially available $C_3$ to $C_{10}$ olefin having a purity of greater than 75%, typically 50%–99%, say 90%. Non-polar impurities, such as ethane, propane, or other hydrocarbons, may be present, but for best results, polar compounds such as oxygen, water, carbon monoxide, carbon dioxide, etc., should be maintained at a low level in the ethylene and alpha olefin feed.

The higher alpha olefins having three to ten carbon atoms may be designated by the formula $R'—CH=CH_2$ wherein $R'$ is hydrocarbon and typically alkyl including cycloalkyl. Alpha olefins may include typically:

TABLE I

| | |
|---|---|
| propene | 3-ethyl pentene-1 |
| butene-1 | octene-1 |
| pentene-1 | 3-methyl heptene-1 |
| 3-methyl butene-1 | 4-methyl heptene-1 |
| hexene-1 | 5-methyl heptene-1 |
| 3-methyl pentene-1 | 6-methyl heptene-1 |
| 4-methyl pentene-1 | 3-ethyl hexene-1 |
| heptene-1 | 4-ethyl hexene-1 |
| 3-methyl hexene-1 | 3-propyl hexene-1 |
| 4-methyl hexene-1 | decene-1 |
| 5-methyl hexene-1 | |

The preferred higher alpha olefin may be propylene, i.e. propene.

The nonconjugated diolefins which may be third monomer components of the copolymers of this invention may preferably include those having 5-14 carbon atoms. Typical of the nonconjugated diolefins may be the following:

(A) Straight chain acyclic dienes such as: 1,4-hexadiene; 1,6-octadiene.

(B) Branched chain acyclic dienes such as: 5-methyl 1-4-hexadiene; 3,7-dimethyl-1,6-octadiene; 3,7-dimethyl-1,7-octadiene; and the mixed isomers of dihydro-myrcene, and dihydro-ocimene.

(C) Single ring alicyclic dienes such as: 1,4-cyclohexadiene; 1,5-cyclo-octadiene; and 1,5-cyclododecadiene.

(D) Multi-ring aliciyclic fused and bridged ring dienes such as: tetrahydroindene; methyltetrahydroindene; dicyclopentadiene; bicyclo (2,2,1) hepta 2,5-diene; alkenyl, alkylidene, cyclo-alkenyl and cyclo-alkylidene norbornenes such as 5-methylene - 2 - norbornene, 5-ethylidene-2-norbornene, 5 - propenyl 2 - norbornene, 5-isopropylidene-2-norbornene, 5 - (4-cyclopentenyl)-2-norbornene; 5-cyclohexylidene-2-norbornene.

The preferred third monomers may be 5-ethylidene-2-norbornene, dicyclopentadiene, or 5 - methylene - 2 - norbornene. Most preferred is 5-ethylidene-2-norbornene.

Formation of the novel copolymers of this invention may be effected by forming a mixture of the monomer components containing the following components by weight, these being per 100 parts of solvent:

TABLE II

| Component | Range | | |
|---|---|---|---|
| | Broad | Preferred | Typical |
| Ethylene | 0.1–10.0 | 1.0–6.0 | 2.75 |
| Higher alpha olefin | 0.1–20.0 | 1.0–15.0 | 12.5 |
| Diolefin | 0.0–2.0 | 0.0–1.0 | 0.22 |

In Table II, as elsewhere in this specification, all parts are parts by weight unless otherwise specifically stated.

Mixtures of these monomers may be used, i.e., more than one alpha-olefin and/or more than one diolefin may be employed. It will be noted that when only ethylene and higher alpha-olefin are present, the product may be a two-component copolymer; when the diolefin is present, the copolymer is a terpolymer. Other compatible components, including those which are copolymerizable to form tetrapolymers, may be present, etc.

The monomer mixture may be polymerized (either batchwise or continuously) to form the desired polymer in the presence of a catalytic amount of a catalyst composition containing, as catalyst, a compound of a transition metal as catalyst and, as cocatalyst, an organometal compound. Thus, the catalyst composition may typically include.

(a) A compound, preferably a halide, of a transition metal, i.e. a metal of Groups I–B through VII–B and VIII of the Periodic Table and having an atomic number falling within the range of 21–30, 39–48, 57–80, and 80–130. The first category including metals starting with scandium (21) and ending with zinc (30) may be preferred; and titanium (22) and vanadium (23) may be most preferred. The halide may be a chloride, bromide, or iodide, preferably chloride. The preferred compound may be titanium tetrachloride or vanadium tetrachloride.

(b) An organometal compound (of a metal of Groups I–A, II–A, II–B. and III–A), preferably an organoaluminum compound $R_n'''AlX_{33-n}$ wherein $R'''$ may be hydrocarbon moiety, typically alkyl, aryl, aralkyl, or alkaryl, X is a halogen, and $n$ is an integer 1–3. An organometal compound is one characterized by the presence of at least one carbon-to-metal bond. The preferred metal is aluminum. Typical compounds may be $R_2'''Zn$, $R_3'''Al$, $R_2'''AlX$, and most preferably $R_2'''AlX$; and the preferred compound may be diethyl aluminum chloride or triisobutyl aluminum.

The preferred catalyst composition may include 0.00001–0.0001 mole, say 0.00005 mole of transition metal halide catalyst and 0.00007–0.0007 mole, say 0.00035 mole of organoaluminum cocatalyst.

Polymerization may be effected by passing 0.1–10, say 2.75 parts of ethylene, 0.1–20, say 12.5 parts of alpha olefin, typically propylene, and 0–1.0, say 0.22 parts of diolefin third monomer, typically 5 - ethylidene - 2 - norbornene when employed, into 100 parts of liquid inert-diluent-solvent reaction medium containing catalyst and cocatalyst in catalytic amounts, i.e., 0.0017–0.017, say 0.00865 part of catalyst and 0.0084–0.084, say 0.042 part of cocatalyst per 100 parts of diluent-solvent. The non-reactive reaction medium may be an aromatic hydrocarbon such as toluene, a saturated aliphatic hydrocarbon such as heptane, pentane, and hexane, or a chlorohydrocarbon such as tetrachloroethylene. All steps in this reaction should preferably be carried out in the absence of oxygen, moisture, carbon dioxide or other harmful materials. Preferably, all reactants and catalysts may be pure and dry and blanketed with inert gas such as nitrogen or methane.

During polymerization, the reaction mixture may be agitated and maintained at temperatures of —40° C. to 100° C., say —10° C. to 70° C., preferably about 30° C. and pressures of 0–1000 p.s.i.g., preferably 0–300 p.s.i.g., say 60 p.s.i.g., during a period of 1–300 minutes, preferably 3–60 minutes, say 15 minutes.

At the end of this period, the polymerization may be found to be complete. The catalyst may be deactivated as by addition of an alcohol such as isopropanol. The mixture may be deashed as by mixing with aqueous medium, preferably aqueous hydrochloride and; the organic layer may be separated and found to contain the following:

TABLE III

| | Parts | |
|---|---|---|
| Component | Typical | Preferred |
| Unreacted ethylene | 0.1–0.5 | 0.275 |
| Unreacted higher alpha olefin | 7.5–12 | 9.85 |
| Unreacted third monomer | 0.04–0.1 | 0.065 |
| Product copolymer | 3.0–7.0 | 5.1 |
| Diluent-solvent | 90–110 | 100 |
| Heavy impurities | 0.01–0.1 | 0.075 |

In practice of the process of this invention, the organic layer at typical temperature of 30° C.–70° C., say 40° C. and pressure of 50 p.s.i.g.–150 p.s.i.g., say 60 p.s.i.g., may be steam-flashed through a nozzle or pressure releasing valve to a pressure of 0 p.s.i.g.–50 p.s.i.g., say 15 p.s.i.g., and a temperature of 70° C.–120° C., say 100° C. to yield a bottoms of aqueous polymer slurry as follows:

TABLE IV

| | Parts | |
|---|---|---|
| Component | Typical | Preferred |
| Product copolymer | 2–7 | 3 |
| Aqueous phase | 93–98 | 97 |

The flash overhead gas may typically contain diluent-solvent and heavy impurities; in normal operations, it may also contain unreacted ethylene, unreacted higher alpha olefin, unreacted third monomer, and water vapor. Commonly it may have the following components:

TABLE V

| | Parts | |
|---|---|---|
| Component | Typical | Preferred |
| Unreacted ethylene | 0.1–0.5 | 0.275 |
| Unreacted higher alpha olefin | 7.5–12 | 9.85 |
| Unreacted third monomer | 0.05–0.1 | 0.065 |
| Diluent-solvent | 90–110 | 100 |
| Heavy impurities | 0.01–0.1 | 0.075 |
| Water (vapor) | 10–20 | 14 |

In practice of this invention, the flash overhead gas may be partially condensed to form (a) a non-condensed gas containing a major portion of diluent-solvent and substantially free of heavy impurities and (b) a partial condensate containing a substantial portion of the heavy impurities and a minor portion of diluent solvent. Partial condensation may be effected by indirect heat exchange or by direct heat exchange.

Partial condensation by direct heat exchange may be carried out by passing the flash overhead gas through a heat exchanger which may be cooled by cooling liquid, typically water.

In the preferred embodiment, the flash overhead gas may be partially condensed by direct heat exchange; and in this embodiment, the flash overhead gas typically in amount of 107.7–142.7, say 124.3 parts may be withdrawn from the flash drum and then contacted with a cooled liquid which is immiscible with the diluent-solvent in the flash overhead gas.

Preferably the immiscible liquid may be aqueous medium, and in the preferred embodiment, it may be water recycled as hereinafter set forth. The immiscible liquid may be added to or contacted with the flashed overhead gas in isoenthalpic amount sufficient to effect partial condensation of the flash overhead gas, i.e. to condense therefrom a substantial portion, preferably 50%–90%, say 85%, of the heavy impurities or higher boiling components therein together with a minor portion (e.g. 10%–30%, say 14%) of diluent solvent and to separate them from the unreacted ethylene, unreacted higher alpha olefin, and major portion (70%–90%, say 86%) of diluent-solvent.

Preferably the immiscible liquid may be admitted to the partial condensation step at temperature of 30° C.–50° C., say 43° C., and preferably it will be admitted in amounts of 50–300 parts, say 200 parts of immiscible liquid.

The partial condensate, now admixed with the cooled immiscible liquid, may contain a substantial portion of the heavy impurities and a minor portion of diluent-solvent as first phase and immiscible liquid as a second phase. The first phase may also contain unreacted higher olefin, unreacted third monomer, and some water. Typically the partial condensate may contain the following components:

TABLE VI

| Component | Parts Typical | Preferred |
|---|---|---|
| First phase: | | |
| Unreacted ethylene | 0–0 | 0 |
| Unreacted higher alpha olefin | 0.025–0.05 | 0.037 |
| Unreacted third monomer | 0.03–0.07 | 0.045 |
| Diluent-solvent | 10–20 | 14 |
| Heavy impurities | 0.01–0.1 | 0.064 |
| Water (dissolved in diluent-solvent) | 0.009–0.018 | 0.012 |
| Second phase: Immiscible liquid | 50–300 | 207 |

The non-condensed gas from the partial condensation may contain a major portion of the diluent-solvent substantially free of heavy impurities. Typically, it may also contain unreacted ethylene, unreacted higher alpha olefin, unreacted third monomer, and some water. Commonly, it may contain the following components:

TABLE VII

| Component | Parts Typical | Preferred |
|---|---|---|
| Unreacted ethylene | 0.1–0.5 | 0.275 |
| Unreacted higher alpha olefin | 7.5–12 | 9.81 |
| Unreacted third monomer | 0.01–0.03 | 0.02 |
| Heavy impurities | 0.005–0.05 | 0.011 |
| Diluent-solvent | 80–90 | 86 |
| Water (as vapor) | 3–10 | 7 |

The immiscible liquid from the partial condensation, usually the lower layer, may be at a temperature of 70° C.–80° C., say 73° C. having been warmed by the latent heat of condensation of the higher boiling components of the flashed overhead. This liquid may be cooled to 30° C.–50° C., say 43° C. and recycled to the partial condensation step. Typically 1%–5%, say 3.5%, say 5–12 parts, typically 7 parts, of this liquid may be withdrawn.

The partial condensate of Table VI may be at temperatures of 70° C.–80° C., say 73° C. and pressures of 10 p.s.i.g.–20 p.s.i.g., say 14 p.s.i.g. The immiscible liquid second phase may be separated from the first phase of unreacted third monomer, higher boiling components, and diluent-solvent.

It is a feature of this invention that 95%–99%, say 96.5% of the immiscible liquid second phase may be cooled to a temperature less than the partial condensation temperature of the flash overhead gas, typically to 30° C.–50° C., say 43° C. The so-cooled immiscible liquid may then be contacted with the flash overhead vapor to effect partial condensation.

In the preferred embodiment, the quantity of immiscible liquid contacted with the flash overhead gas may be sufficient to partially condense the latter. Preferably it will be sufficient to effect condensation of a minor portion e.g. 10%–30%, say 14%, of the inert diluent-solvent and a substantial portion of the heavy impurities including $C_{10}$ and heavier components, typically produced as by-products during polymerization. The partial condensate may thus typically include inert diluent-solvent, a substantial portion (i.e., 50%–90% and typically 85%) of heavy impurities and unreacted third monomer. The quantity and temperature of the immiscible liquid contacted with the flash overhead gas may be isoenthalpic, i.e., thermally sufficient to (i.e., having an enthalpy or heat content such that it will) permit condensation of the heavier components of the flash overhead gas.

The non-condensed gas, i.e. the uncondensed portion of the flash overhead gas may, upon separation from the partial condensate, be condensed to separate therefrom condensed diluent-solvent (i.e. the major portion thereof) which may be recovered substantially free of heavy impurities, and preferably further treated as hereinafter set forth and recycled. The remaining unreacted ethylene and higher alpha olefin may be withdrawn and recycled.

The partial condensate, from which the immiscible liquid second phase has been separated, may be withdrawn substantially free of the second phase.

When partial condensation is effected by indirect heat exchange, the partial condensate may contain essentially the same components as set forth in Table VI, except that it will contain only 5–15, say 7 parts of immiscible liquid in the second phase—the water being brought in with the charge flash overhead gas.

The partial condensate, or in the preferred embodiment, first phase of the partial condensate, (q.v. Table VI) may be distilled in a diene recovery tower to separate heavy purge components as bottoms therefrom. It is a feature of this invention that there may be added to the lower portion of this distillation tower, preferably in the reboiler circuit, 0.1–0.5 parts, say 0.286 part of a heavy hydrocarbon solvent having a molecular weight of typically 100–250. The preferred heavy hydrocarbon solvent may be decane, dodecane, a naphtha boiling in the range 150° C.–200° C., or a commercially available $C_{10}$ petroleum fraction such as that sold by Humble Oil Company under the trademark Varsol. Presence of this heavy hydrocarbon, which typically has a boiling point or initial boiling point at least 25° C., typically 50° C.–100° C., above the end point or boiling point of the diluent-solvent, assists in effecting and controlling distillation.

Distillation may be carried out at tower inlet temperature of 70° C.–80° C., say 73° C., and pressure of 10 p.s.i.g.–20 p.s.i.g., say 14 p.s.i.g. Tower overhead may be at 40° C.–60° C., say 50° C. at 6 p.s.i.g.–10 p.s.i.g., say 8 p.s.i.g.; and tower bottoms may be at 150° C.–190° C., say 165° C., and 8 p.s.i.a.–12 p.s.i.a., say 10 p.s.i.a.

Diene recovery tower bottoms may include the following:

TABLE VIII

| Component | Parts Typical | Preferred |
|---|---|---|
| Heavy impurities | 0.01–0.1 | 0.064 |
| Unreacted third monomer | 0.0002–0.002 | 0.001 |
| Heavy aliphatic hydrocarbon solvent | 0.1–0.5 | 0.286 |

Overhead product from the diene recovery tower may include the following typical components:

TABLE IX

| Component | Parts Typical | Preferred |
|---|---|---|
| Diluent-solvent | 10–20 | 14 |
| Unreacted third monomer | 0.03–0.07 | 0.044 |
| Unreacted ethylene | 0–0 | 0 |
| Unreacted higher alpha olefin | 0.025–0.05 | 0.037 |
| Water (dissolved in diluent-solvent) | 0.009–0.018 | 0.012 |

Diene recovery tower overhead may be condensed at 30° C.–50° C., say 40° C., a portion of the condensate being returned as reflux to the distillation operation. Any unreacted ethylene and higher alpha olefin in the noncondensibles may be withdrawn and recycled.

The diene recovery tower overhead condensate and the condensed diluent-solvent (from the initially uncondensed portion of the flash overhead gas) may be combined, separated from water present therein (in amount of 3–10, say 7 parts) as by decantation, and stripped further of water in a stripping operation prior to recycle. Non-condensed gas, including 0.1–0.5, say 0.275 part of ethylene and 7.5–12, say 9.85 parts of higher alpha olefin may be recovered.

Typically stripping may be carried out, in a stripping tower operating at a feed temperature of 90° C.–110° C., say 100° C. at 50 p.s.i.g.–70 p.s.i.g., say 57 p.s.i.g., an overhead temperature of 100° C.–130° C., say 117° C. and 50 p.s.i.g.–70 p.s.i.g., say 57 p.s.i.g., and a bottoms temperature of 120° C.–140° C., say 127° C. at 50 p.s.i.g.–70 p.s.i.g., say 59 p.s.i.g.

Typical stripper feed may include the following components:

TABLE X

| Component | Parts Typical | Preferred |
|---|---|---|
| Unreacted ethylene | 0.02–0.05 | 0.037 |
| Unreacted higher alpha olefins | 4–6 | 4.95 |
| Diluent-solvent | 140–180 | 160 |
| Unreacted third monomer | 0.03–0.07 | 0.064 |
| Water (dissolved in diluent-solvent) | 0.057–0.073 | 0.065 |

Typical stripper bottoms, which may be recycled to the polymerization unit, may include the following components in the indicated parts by weight:

TABLE XI

| Component | Parts Typical | Preferred |
|---|---|---|
| Unreacted third monomer | 0.03–0.07 | 0.064 |
| Diluent-solvent | 90–110 | 100 |

Stripper overhead, containing substantially pure diluent-solvent together with water, may have the following composition:

TABLE XII

| Component | Parts Typical | Preferred |
|---|---|---|
| Diluent-solvent | 40–80 | 60 |
| Water | 0.057–0.073 | 0.065 |

Practice of the novel proces of this invention may in the preferred embodiment be carried out according to FIG. 1 of the flow sheet set forth in the drawing. In the drawing, the flash drum overhead gas feed to the unit may be passed from the flash drum through line 10 to collection drum 11. Prior to admission to collection drum 11, cooled immiscible liquid may be admitted to line 10 through line 12 to effect partial condensation of the flashed overhead gas in line 10. Drum 11 may include a collection portion 13 wherein immiscible liquid may be collected before being withdrawn through line 14 and pump 15. A portion of liquid in line 14 may be withdrawn through line 16. A second portion may be passed through heat exchanger or immiscible liquid cooler 17 (wherein it may be cooled by water from line 18) before being passed through line 12 to line 10.

When partial condensation is to be carried out by indirect heat exchange, as shown in FIG. 2, the flash overhead gas may be passed from the flash drum through line 10 to partial condenser 70 to which cooling liquid may be admitted through line 71. The partial condensate may pass through line 10 to collection drum 11. Drum 11 may include a collection portion 13 wherein immiscible liquid (mainly water admitted with the flash overhead gas) may be collected before being withdrawn through line 14 and pump 15.

Non-condensibles (in the embodiment of FIG. 1 or FIG. 2) in collection drum 11 may be withdrawn therefrom through line 19, pased through heat exchanger 20 (cooled by cooling water from line 21) and thence to stripper feed drum 22.

Partial condensate (in the embodiment of FIG. 1 or FIG. 2) collected in collection drum 11 may be passed therefrom through line 28 and admitted to diene recovery tower 31. Heavy purge components will be concentrated as they descend the tower. Heavy hydrocarbon solvent may be added as through line 32, the bottoms passing through line 33 and reboiler 34 heated by steam from line 35 before being returned to tower 31. Bottoms may be withdrawn from tower 31 through line 36 and pump 37, a portion thereof being returned to tower 31. Line 32 may join with line 36 immediately prior to the entrance of the latter to tower 31. The net bottoms containing heavy purge components and heavy hydrocarbon solvent may be withdrawn through line 38 and passed through exchanger 39 cooled by water from line 40 before being withdrawn from the system.

The overhead product distillate from tower 31 may pass through line 41 and be condensed in heat exchanger 42 cooled by cooling water from line 43. A portion of the hydrocarbon component in distillate drum 44 may be passed through line 45 and pump 46 to serve as reflux for distillation tower 31. Overhead product may be withdrawn through line 47 and may be passed to stripper feed drum 22.

Gases which are admitted to drum 44 may be withdrawn therefrom and passed to stripper feed drum 22 through line 23 containing steam eductor 24 to which steam is admitted through line 25. Condensibles in line 23 may be condensed by passage through heat exchanger 26 cooled by water from line 27.

Ethylene and higher alpha olefins may be withdrawn from drum 22 through line 48. Water may be withdrawn through line 49. The supernatant hydrocarbon portion of the liquid in stripper feed drum 22 may be withdrawn through line 50, passed through pump 29 and heated in solvent heat exchanger 51 by steam from line 52, and passed to stripper 53. Stripper bottoms may be reboiled by passage through line 54 and reboiler 55 heated by steam from line 56. Net bottoms may be withdrawn through line 57 and pump 30. Stripper overhead may be withdrawn through line 58, condensed in heat exchanger 59, cooled by water from line 60 and collected in stripper feed drum 22.

Practice of the novel process of this invention may be apparent from the following specific example wherein, as elsewhere in this description, all parts are parts by weight unless otherwise indicated.

EXAMPLE 1

In this example (which represents practice of a preferred embodiment of this invention) 2.75 parts of ethylene, 12.5 parts of propylene, and 0.22 part of 5-ethylidene-2-norbornene (ENB) may be introduced into a polymerization reactor together with 0.00865 part of vanadium tetrachloride catalyst and 0.042 part of diethyl aluminum chloride cocatalyst and 100 parts of hexane. After reaction at 30° C. and 60 p.s.i.g., the reaction mixture containing 5.1 parts of terpolymer, may be withdrawn from the reaction vessel, and contacted with 60 parts of water to extract spent catalyst.

The organic layer (polymer cement) may be removed from the aqueous layer and vaporized by steam injection in a flash drum at 100° C. and 15 p.s.i.g. The terpolymer residue may be further treated to recover terpolymer. The flash overhead gas may contain the following components:

TABLE XIII

| Component: | Parts |
|---|---|
| Ethylene | 0.275 |
| Propylene | 9.85 |
| ENB | 0.065 |
| Hexane | 100 |
| Water (vapor) | 14 |
| Heavy impurities | 0.075 |

The flash overhead gas at 100° C. and 15 p.s.i.g. may be passed through line 10 wherein it may be contacted with 200 parts of recirculating aqueous cooled immiscible liquid i.e., water at 43° C. The mixture may be partially condensed in collection drum 11 to give 14.1 parts of supernatant hydrocarbon partial condensate as a first phase and water as a second phase as follows:

TABLE XIV

| Component: | Parts |
|---|---|
| First phase: | |
| Unreacted ethylene | 0 |
| Unreacted propylene | 0.037 |
| ENB | 0.045 |
| Hexane | 14 |
| Heavy impurities | 0.064 |
| Water (dissolved in diluent-solvent) | 0.012 |
| Second phase: Water | 207 |

Aqueous cooled immiscible liquid (i.e. water) may be withdrawn from collection drum 11 at 73° C. in an amount of 207 parts. Seven parts of this may be withdrawn through line 16, the remainder being cooled in heat cooled in heat exchanger 17 to 43° C. before being recycled to mix with flshed overhead gas in line 10.

The non-condensed gas leaving collection drum 11 through line 19 may contain the following:

TABLE XV

| Component: | Parts |
|---|---|
| Ethylene | 0.275 |
| Propylene | 9.81 |
| Hexane | 86 |
| Water (as vapor) | 7 |

This non-condensed gas at 73° C. and 14 p.s.i.g. may be cooled in exchanger 20 to 43° C., wherein hexane may be condensed, and then passed to stripper feed drum 22.

14.1 parts of the partial hydrocarbon condensate, containing 85% of the heavy non-EPT (or EPR) components leaving the reactor may be passed to diene recovery tower 31. There may also be admitted to the diene recovery tower 0.286 part of a heavy aliphatic hydrocarbon solvent having a boiling range of 150° C.–200° C. Reflux ratio (pumped reflux/product) may be 0.33; and the overhead in line 41 may be as follows:

TABLE XVI

| Component: | Parts |
|---|---|
| Ethylene | 0.00 |
| Propylene | 0.05 |
| ENB | 0.058 |
| Hexane | 18.6 |
| Water (dissolved in hexane) | 0.016 |

18.7 parts of overhead in line 41 at 50° C. and 6 p.s.i.a. may be condensed in heat exchanger 42 to a temperature of 34° C. and passed to distillate drum 44.

Uncondensed gas in line 23 may have the following composition:

TABLE XVII

| Component: | Parts |
|---|---|
| Ethylene | 0.00 |
| Propylene | 0.05 |
| Hexane | 0.43 |

Gas in line 23 may be withdrawn via steam eductor 24, actuated by steam from line 25, cooled to 34° C. in exchanger 26, and passed to stripper feed drum 22.

Bottoms from diene recovery tower 31 in an amount of 0.55 part may be withdrawn at 165° C. 0.35 part of bottoms may be withdrawn through line 38 having the following composition:

TABLE XVIII

| Component: | Parts |
|---|---|
| Heavy impurities | 0.064 |
| ENB | 0.001 |
| Heavy aliphatic hydrocarbon solvent | 0.286 |

The condensed hydrocarbon phase in distillate drum 44 may have the following composition:

TABLE XIX

| Component: | Parts |
|---|---|
| Ethylene | 0.00 |
| Propylene | 0.00 |
| ENB | 0.058 |
| Hexane | 18.17 |
| Water (dissolved in hexane) | 0.016 |

This hydrocarbon phase, in an amount of 13.7 parts, may be passed at 34° C. through line 47 to stripper feed drum 22.

Uncondensed gas in stripper feed 22, in amount of 21.5 parts, may be withdrawn through line 48 having the following composition:

TABLE XX

| Component: | Parts |
|---|---|
| Ethylene | 0.275 |
| Propylene | 9.85 |
| Hexane | 10.5 |
| Water (vapor) | 0.85 |

This may be passed to the monomer recovery system where hexane may be separated and returned to drum 22. 6.2 parts of aqueous liquid may be withdrawn through line 49.

165.1 parts of condensate may be withdrawn through line 50 at 40° C. having the following composition:

TABLE XXI

| Component: | Parts |
|---|---|
| Ethylene | 0.037 |
| Propylene | 4.95 |
| Hexane | 160 |
| ENB | 0.064 |
| Water (dissolved in hexane) | 0.065 |

This liquid in line 50 may be pumped through pump 29 to heat exchanger 51 wherein it may be heated to 100° C. The heated liquid may be admitted as stripper feed to the stripper at 57 p.s.i.g.

Stripper bottoms at 127° C. and 59 p.s.i.g., withdrawn through line 54 and passed through reboiler 55 to be recycled to the reactor or withdrawn from the system through line 57 by pump 30 may have the following composition.

TABLE XXII

| Component: | Parts |
|---|---|
| Hexane | 100 |
| ENB | 0.064 |

Stripper overhead in line 58 at temperature of 117° C. and 58 p.s.i.g may have the following composition:

TABLE XXIII

| Component: | Parts |
|---|---|
| Hexane | 60 |
| Water | 0.065 |

This overhead may be condensed in exchange 59 to 43° C. and recirculated to stripper feed drum 22.

It will be apparent to those skilled in the art that this novel process permits attainment of outstanding advantages. It is a particularly significant feature of this invention that it takes advantage of the vapor state of the feed by partially condensing the undesirable heavy impurities in a minor portion of the diluent-solvent, thus considerably reducing the size of the diene recovery tower. The novel process of this invention makes it possible to process reactor effluent at much lower capital costs because of elimination of at least one heat exchanger and one tower and associated auxiliaries as well as a decrease in size of the diene recovery tower and its associated auxiliaries. The cost of utilities is significantly reduced because of the elimination of utilities needed for vaporation and condensation of diluent-solvent as well as those needed for normal operation of an additional tower. Of particular significance is the decreased reboiler load in the diene recovery tower which permits attainment of outstandingly low utility operating costs.

In the preferred embodiment, the process may be further characterized by minimum pressure drop between the flash drum and the partial condensate collection drum, by the elimination of a large and expensive heat exchanger, and by the elimination of auxiliaries associated therewith.

Although this invention has been illustrated by reference to specific embodiments, it will be apparent to those skilled in the art that various changes and modifications may be made which clearly fall within the scope of this invention.

What is claimed is:

1. A process of separately recovering unreacted monomers and diluent-solvent, substantially free of high boiling heavy impurities, from a reacted copolymerization mixture containing unreacted ethylene, unreacted $C_3$ to $C_{10}$ higher alpha olefin, a liquid diluent-solvent, ethylene-$C_3$ to $C_{10}$ alpha olefin copolymer, high boiling heavy impurities and catalyst composition of a compound of a transition metal-organic metal compound which comprises flash vaporizing from the deashed reactor effluent, as overhead vapors, substantially all of the unreacted ethylene, unreacted $C_3$ to $C_{10}$ higher alpha olefin, diluent-solvent, high boiling heavy impurities and some water vapor, partially condensing said overhead vapor by directly contacting the same with cooling water at a temperature below that of the said overhead vapors, separately recovering overhead gaseous vapors (A) containing substantially all of the unreacted ethylene and unreacted $C_3$ to $C_{10}$ higher alpha olefin, a major portion of the diluent-solvent, substantially none of the high boiling heavy impurities and a small amount of water vapor and a two phase water-hydrocarbon condensate fraction, the bottom phase (B) containing substantially all the water and the upper phase (C) containing substantially no unreacted ethylene nor $C_3$ to $C_{10}$ higher alpha olefin, a minor portion of diluent-solvent, a major portion of the high boiling heavy impurities and a small amount of occluded and dissolved water, further subjecting vapor fraction (A) to partial condensation, collecting said partial condensate in a collecting zone (D), a vapor phase (E) and a liquid phase (F), separately recovering the gaseous phase (E) containing the major amount of unreacted ethylene, and unreacted $C_3$ to $C_{10}$ higher alpha olefin and a small amount of vaporized diluent-solvent and water vapor and the condensed liquid phase (F) containing a minor amount of unreacted ethylene and unreacted $C_3$ to $C_{10}$ higher alpha olefin, the major amount of diluent-solvent, and a small amount of occluded and dissolved water, subjecting fraction (F) to a further stripping and distillation to recover diluent-solvent, substantially free of high boiling heavy impurities, as bottoms therefrom, partially condensing the overhead vapors from the said stripping operation and returning the vapor-liquid mixture to collecting zone (D).

2. A process as in claim 1 wherein the $C_3$ to $C_{10}$ higher alpha olefin is propylene, the copolymer is ethylene-propylene copolymer and the diluent-solvent is n-hexane.

3. A process as in claim 2 wherein condensate phase (C) contains from about 50 to about 90% of all of the high boiling heavy impurities and is subjected to fractional distillation with added heavy aliphatic hydrocarbon solvent, the overhead therefrom being condensed and introduced into collecting zone (D), the bottoms therefrom, containing the high boiling heavy impurities, and said heavy aliphatic hydrocarbon solvent being withdrawn from the system.

4. A process as in claim 3 wherein condensate phase (C) has added thereto a heavy aliphatic hydrocarbon solvent having a boiling range of between about 150 and about 200° C. and is partially withdrawn, as bottoms, heated and returned to the distillation as reboiler reflux.

5. A process as in claim 1 wherein the monomers include a non-conjugated diene as well as ethylene and a $C_3$–$C_{10}$ higher alpha olefin, and the copolymer is a terpolymer of ethylene, a $C_3$–$C_{10}$ higher alpha olefin and a non-conjugated diene.

6. A process as in claim 5 wherein the $C_3$–$C_{10}$ higher alpha olefin is propylene, the non-conjugated diene is 5-ethylidene-2-norbornene, and the diluent-solvent is n-hexane.

7. A process as in claim 5 wherein condensate phase (C) contains from about 50 to about 90% of all of the higher boiling heavy impurities, and substantial amounts of non-conjugated diene and is subjected to fractional distillation with added heavy aliphatic hydrocarbon solvent, the overhead therefrom containing substantially all of the non-conjugated diene, and a substantial amount of diluent-solvent, the overhead being condensed and both phases being introduced into collecting zone (D), the bottoms therefrom, containing the higher boiling heavy impurities, and said heavy hydrocarbon solvent, being withdrawn from the system.

8. A process as in claim 7 wherein condensate phase (C) has added thereto a heavy aliphatic hydrocarbon solvent having a boiling range of between about 150 and 200° C. and is partially withdrawn as bottoms, heated and returned to the distillation as reboiler reflux.

References Cited

UNITED STATES PATENTS

| | | | |
|---|---|---|---|
| 3,341,503 | 9/1967 | Paige et al. | 260—80.78 |
| 3,453,182 | 7/1969 | Reber et al. | 203—2 |

JOSEPH L. SCHOFER, Primary Examiner

R. A. GAITHER, Assistant Examiner

U.S. Cl. X.R.

260—88.2 A, 94.9 P